United States Patent [19]

Grundherr

[11] 4,118,129
[45] Oct. 3, 1978

[54] ROTARY WHEEL PRINTING SYSTEM

[75] Inventor: Willy J. Grundherr, Sunnyvale, Calif.

[73] Assignee: Qume Corporation, Hayward, Calif.

[21] Appl. No.: 700,654

[22] Filed: Jun. 28, 1976

Related U.S. Application Data

[63] Continuation of Ser. No. 485,055, Jul. 1, 1974, abandoned.

[51] Int. Cl.² .............................................. B41J 1/30
[52] U.S. Cl. ............................ 400/144.2; 400/61; 400/154.4; 400/157.3; 400/320; 250/205
[58] Field of Search ...................... 197/1 R, 18, 49, 53, 197/48; 101/93.03, 93.13, 93.14, 93.18, 93.19; 250/205, 570; 318/696, 685, 138

[56] References Cited
U.S. PATENT DOCUMENTS

| | | | |
|---|---|---|---|
| 3,232,404 | 2/1966 | Jones | 197/49 |
| 3,586,953 | 6/1971 | Markkanen et al. | 318/685 |
| 3,773,161 | 11/1973 | Bossi | 197/18 X |
| 3,789,971 | 2/1974 | Deyesso et al. | 197/18 |
| 3,859,539 | 1/1975 | Allington | 250/205 X |
| 4,004,504 | 1/1977 | Lundquist | 101/93.03 |

*Primary Examiner*—Paul T. Sewell
*Attorney, Agent, or Firm*—Townsend and Townsend

[57] ABSTRACT

The print wheel and carriage position control signal generators each employ an LED light source for illuminating light sensitive detectors associated with the timing track of an encoder disc rotatably mounted on the print wheel or carriage motor shaft. The detectors are arranged to generate a pair of signal trains having a constant phase displacement in response to rotation of the associated disc. These signal trains are shaped and processed to provide position reference signals used to control an associated position counter unit and an electronic servo control system for driving the associated motor, the servo control system having both a position and a rate mode of operation. A separate light sensor is arranged to be constantly illuminated by the LED source to provide intensity monitoring signals which are compared with a reference voltage in a feedback circuit so that any variation in the light intensity is automatically corrected. The electronic control system provides variable hammer striking intensity tailored to the individual characters or symbols comprising the print wheel font. A memory stores individual address characters each corresponding to different ones of the print wheel symbols and individual hammer intensity characters associated with different ones of the address characters. When the print wheel is rotated to the proper position, the corresponding hammer intensity character is fetched from memory and used to specify the intensity with which the symbol is impressed against the print medium by a solenoid hammer drive unit.

14 Claims, 16 Drawing Figures

ROTARY WHEEL PRINTING SYSTEM

This is a continuation of application Ser. No. 485,055, filed July 1, 1974 now abandoned.

BACKGROUND OF THE INVENTION

This invention relates to electromechanical printing devices of the type employing a rotary print wheel. More particularly, this invention relates to printing systems of the type noted wherein the rotary print wheel is both rotated and translated by a pair of motors under control of an electronic control system.

Rotary printing systems are known in which the rotary print wheel is mounted on a carriage for translation across the width of the print throat area during printing. The carriage is typically translated from left to right through a series of cables and pulleys driven incrementally by a D.C. motor controlled by a suitable electronic control system. As the carriage-wheel assembly is translated from print position to print position along a line, the print wheel is rotated so that the character pad bearing the next character to be printed is aligned with the striking end of a print hammer, also mounted on the carriage, when the carriage is momentarily stopped. When the carriage stops, the print hammer is actuated to impress the character borne by the pad against an inking ribbon and the face of the printing media to print that character. After the print hammer rebounds, the carriage is translated to the next character location, the print wheel is rotated so that the proper character pad is aligned with the print hammer, and the next character is printed. This process continues until a complete line has been so printed, after which the carriage is returned to the starting position in preparation for printing the next line of characters.

Proper operation of rotary printing systems depends on a number of factors. Firstly, accurate positioning mechanisms must be employed for both the carriage translation mechanism and the print wheel rotating mechanism to insure that the characters are printed at exactly the right location with the proper orientation. Both optical and magnetic encoders have been employed in the past for this purpose, and while satisfactory for some applications - particularly low speed applications - have not proven altogether satisfactory in applications requiring a wide variety of character spacing or fonts having differing total numbers of characters.

Another factor critically affecting performance of rotary printing systems is the manner in which the print hammer is operated during the actual printing of a character. In the past, hammer drive units have been designed to provide a consistent hammer striking force regardless of the character being printed in an effort to obtain uniform print density from character to character and line to line. However, not all characters in a given font require an identical striking force in order to print with uniform density. In fact, different font characters have been found to require different striking forces in order to achieve uniform density along an entire line of different characters. On the other hand, in some applications it is desirable to print selected characters or words or phrases with a different density from the remaining printed material in order to improve the informational content of the document being printed, e.g., to provide italics; a particular emphasis for a given symbol, word or phase; or the like. Similarly, a hammer drive unit having the capacity to provide variable hammer striking force is highly desirable when the associated printing system is employed to produce several copies of the document being printed in applications where the total number of copies required varies from document to document. Conventional hammer drive units providing only a constant hammer striking force are totally unsuited for those applications having one or more of the above requirements.

SUMMARY OF THE INVENTION

The invention comprises a rotary printing system which is extremely inexpensive to fabricate, which provides extremely flexible and precise print wheel and carriage positioning at high speeds, and which provides a variable print hammer striking force capable of being adjusted over a wide range of magnitudes. In the preferred embodiment, the print wheel and carriage stepping motors are each provided with an opto-electronic position sensing circuit for generating precise position control signals for the associated electronic control system, the position sensing unit having an opto-electronic feedback circuit for providing precise self-regulation of the magnitude of the output signals therefrom.

The electronic control system includes a character register for storing data representative of a character to be printed supplied from an associated source; a memory device for storing both character selection information and also hammer intensity information associated with the individual characters on the print wheel font; a print wheel position counter for generating signals indicative of the instantaneous angular position of the print wheel; an arithmetic unit for generating signals representative of the angular position of the desired character on the print wheel relative to the character printing position, and the initial optimum direction of rotation of the wheel; a carriage position counter for indicating the instantaneous position of the print wheel character relative to the next character print position along a line; and a timing and control unit responsive to the signals generated by the aforementioned units for generating control signals for a hammer drive unit, a print wheel drive unit and a carriage drive unit, as well as timing signals for clocking the print wheel and carriage position counters and select signals for specifying read out of the character selection or the hammer intensity information from the memory.

The character selection information portion of the memory specifies the address on the print wheel of a character to be printed and is used to control the positioning of the print wheel prior to the printing of a specified character. The hammer intensity information portion of the memory specifies the intensity with which the print hammer is to strike the corresponding character on the print wheel and is used to control the hammer striking intensity during printing of the specified character. The former is used to control the positioning of the print wheel prior to printing of a specified character; the latter is used to control the hammer striking intensity during printing of the specified character.

The print wheel drive unit and the carriage drive unit each comprise a servo control system operable in both a position mode and a rate mode, the former being employed when the print wheel or the carriage is statically positioned for printing, the latter being employed during motion of the print wheel or the carriage. In position mode, a reference signal indicating deviation of the print wheel or carriage from a null position is used to generate a correction signal to reposition the associated movable member to the null position. In rate mode, the position reference signals from the associated optoelectronic position sensing circuit are shaped and processed to provide a plurality of sequentially sampled reference signals indicating instantaneous velocity of the associated moveable member, while the position signals from the associated position counter are converted into a correction signal representative of a predetermined ideal motor velocity. The instantaneous velocity signals and the ideal velocity signals are combined to provide an optimum error correction voltage for driving the associated motor so that the motor is driven in such a manner as to track the optimal acceleration-deceleration curve of the servo system in order to position the associated moveable member to the proper position without positional overshoot.

For a fuller understanding of the nature and advantages of the invention, reference should be had to the ensuing detailed description taken in conjunction with the accompanying drawings.

BRIEF DESCRIPTION OF THE DRAWINGS

FIG. 7 is a partial schematic diagram of the optoelectronic encoder unit;

DESCRIPTION OF THE PREFERRED EMBODIMENT

Figure 1:
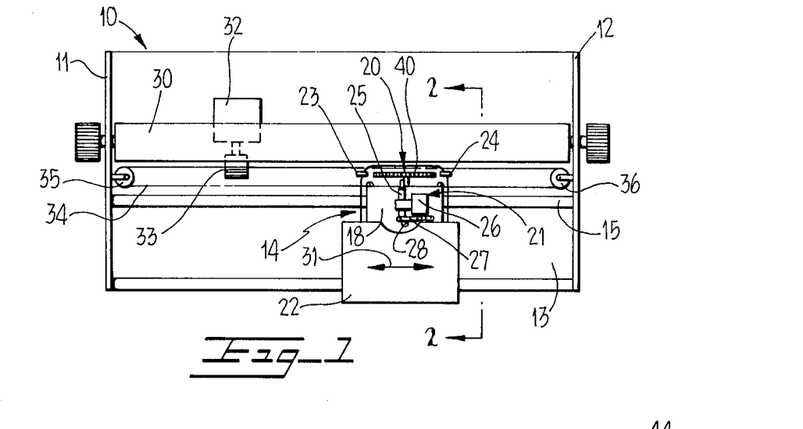
FIG. 1 is a top plan view of a rotary printer embodying the invention.

Turning now to the drawings, FIG. 1 is a top plan view of a rotary printer embodying the invention. Printer 10 has a pair of end walls 11, 12 and a base 13 for housing the electrical and mechanical components of the preferred embodiment. A carriage assembly 14 is slidingly supported on a pair of support rods 15, 16 extending laterally between side walls 11, 12. Carriage assembly 14 includes a base plate 18 which provides support for a rotary print wheel drive assembly 20 shown in FIG. 2, a print hammer solenoid assembly 21, an ink ribbon cartridge 22, and a cartridge drive apparatus (not shown), and a pair of inked ribbon guides 23, 24.

Print hammer solenoid assembly 21 includes a translatable hammer 25, a solenoid 26, a pivotable hammer striking arm 27 and a hammer rebound stop 28.

Ink ribbon cartridge 22 is preferably a cartridge of the type disclosed in commonly assigned co-pending U.S. Patent application Ser. No. 449,131, filed Mar. 7, 1974. The cartridge drive apparatus for cartridge 22 is preferably the apparatus disclosed in commonly assigned copending U.S. Patent application, Ser. No. 448,848, filed Mar. 7, 1974.

A conventional platen 30 is rotatably secured to end walls 11, 12 rearwardly of carriage assembly 14 and is preferably provided with a manual-automatic feed mechanism of the type disclosed in commonly assigned co-pending U.S. Patent application Ser. No. 448,870, filed Mar. 7, 1974.

Carriage assembly 14 is translated in the opposite directions indicated by arrow 31 by means of a reversible D.C. motor 32 secured to base 13 and having a sheave 33 mounted on the drive shaft thereof. Rotational motion of sheave 33 is converted to translational movement of carriage assembly 14 by means of a drive cable 34 which is wrapped about sheave 33 received about a pair of pulleys 35, 36 secured to end walls 11, 12, respectively, and secured to base plate 18 of carriage assembly 14.

In operation, actuation of DC motor 32 with signals of a first polarity or phase causes rotation of sheave 33 in a first direction which in turn results in the translation of carriage assembly 14 in a first direction by cable 34. Application of signals of an opposite polarity or phase to DC motor 32 causes rotation of sheave 33 in the opposite direction resulting in translation of carriage assembly 14 in the opposite direction by cable 34.

The various components comprising the electronic control system descirbed below are not ilustrated in FIG. 1, but preferably are mounted on conventional plug-in printed circuit boards located in printer 10 rearwardly of platen 30.

Figure 2:
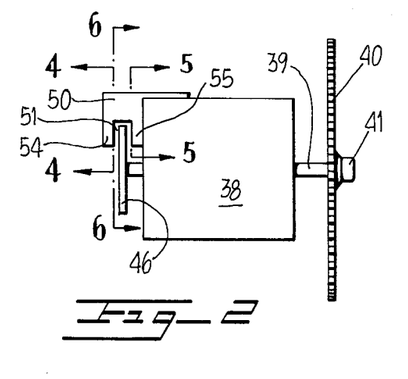
FIG. 2 is a partial sectional view taken along lines 2—2 of FIG. 1 illustrating the print wheel optical encoder.
Figure 2A:
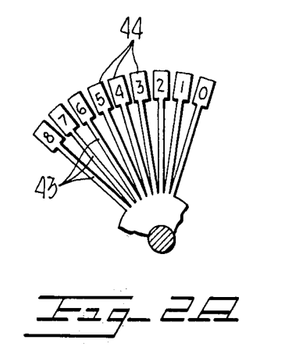
FIG. 2A is a front elevational view of the print wheel.

FIG. 2 is a partial side elevational view illustrating the configuration of rotary print wheel drive assembly 20. A conventional reversible DC motor 38, has an output shaft 39 on one end of which a rotary print wheel 40 is releasably secured by hub 41. With reference to FIG. 2A, rotary print wheel 40 has a plurality of radially extending spokes 43 equiangularly distributed about the axis thereof. Each spoke 43 terminates in an enlarged character pad portion 44 on which a raised character is embossed. In the preferred embodiment, rotary print wheel 40 is provided with 96 spokes, 94 of which terminate in character pads and the remaining two having an index pad which serves to indicate the position along a line of the next character to be printed. With the optical encoder disc and counter logic described below, rotary print wheels having different numbers of spokes up to a maximum of 192 may be employed as desired, to meet the requirements of a particular application.

Figure 3:
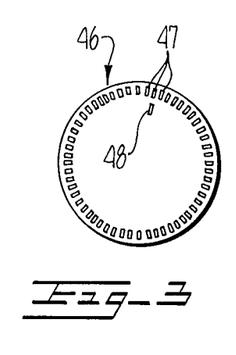
FIG. 3 is a front elevational view of the optical encoder disc.

Secured to the other end of DC motor drive shaft 39 is an optical encoder disc 46 shown in FIG. 3. Disc 46 is preferably fabricated from an opaque material and is provided with a circumferentially arranged timing track consisting of a plurality of transparent slots 47 formed therein. Disc 46 is additionally provided with an index slot 48 formed therein radially inwardly of the timing track. As will be apparent to those skilled in the art, disc 46 may be fabricated in a complementary fashion, if desired, of a transparent material in which case slots 47, 48 would comprise opaque marks placed thereon. In the preferred embodiment, the print wheel encoder disc has 192 timing track slots.

Figure 4:
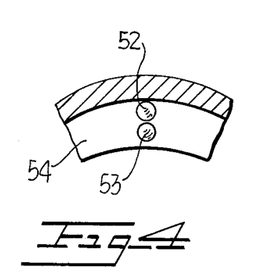
FIG. 4 is a partial sectional view taken along lines 4—4 of FIG. 2 showing the optical encoder light sources.
Figure 5:
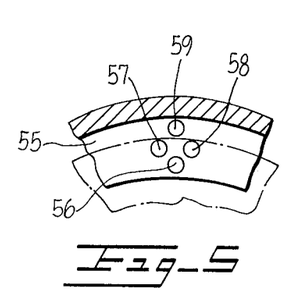
FIG. 5 is a partial sectional view taken along lines 5—5 of FIG. 2 illustrating the light receptors of the optical encoder.

Secured to the encoder disc end of D.C. motor 38 is a housing 50 having a downwardly opening slot 51 in which a portion of the encoder disc 46 is received. With reference to FIG. 4, a pair of light emitting diodes 52, 53 or other equivalent light source are secured in outer wall 54 of housing 50. With reference to FIG. 5, a plurality of light sensitive elements 56–59 are secured in inner wall 54, elements 56 being positioned to receive light from source 53 and elements 57–58 being positioned to receive light from source 52.

Figure 6:
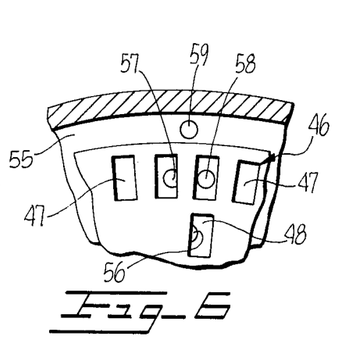
FIG. 6 is a partial sectional view taken along lines 6—6 of FIG. 2 illustrating the positional relationship between the light sensors and the encoder disc timing marks.

FIG. 6 illustrates the positional relationships between receptors 56-69 and timing slots 47, 48 of disc 46. As shown in this Fig., receptor 56 is positioned in housing 50 in alignment with the path of index slot 48 in such a manner as to receive light from source 53 once per revolution when index slot 48 unblocks the light path therebetween. Light receptors 57, 58 are mounted in the path of timing slots 47 so that the amount of light incident thereto from source 52 is controlled by timing slots 47. In addition, light receptors 57, 58 are spaced along the timing track by a distance related to the spacing of timing slots 47 in such a manner that the output signals from this pair of elements will always be 90 degrees out of phase. Receptor 59 is located above the upper edge of disc 46 so that light from source 53 is continuously incident thereto whenever sources 52, 53 are energized.

With reference to FIG. 7, receptor 56 comprises a phototransistor having a collector coupled to a source of reference voltage V and an emitter coupled to the input of a Schmitt trigger circuit 60 or the like. The output of Schmitt trigger circuit 60, which is positive-going pulse-termed INDEX — occurring once per revolution of print wheel 40, is coupled to an output terminal 61.

Figure 12:
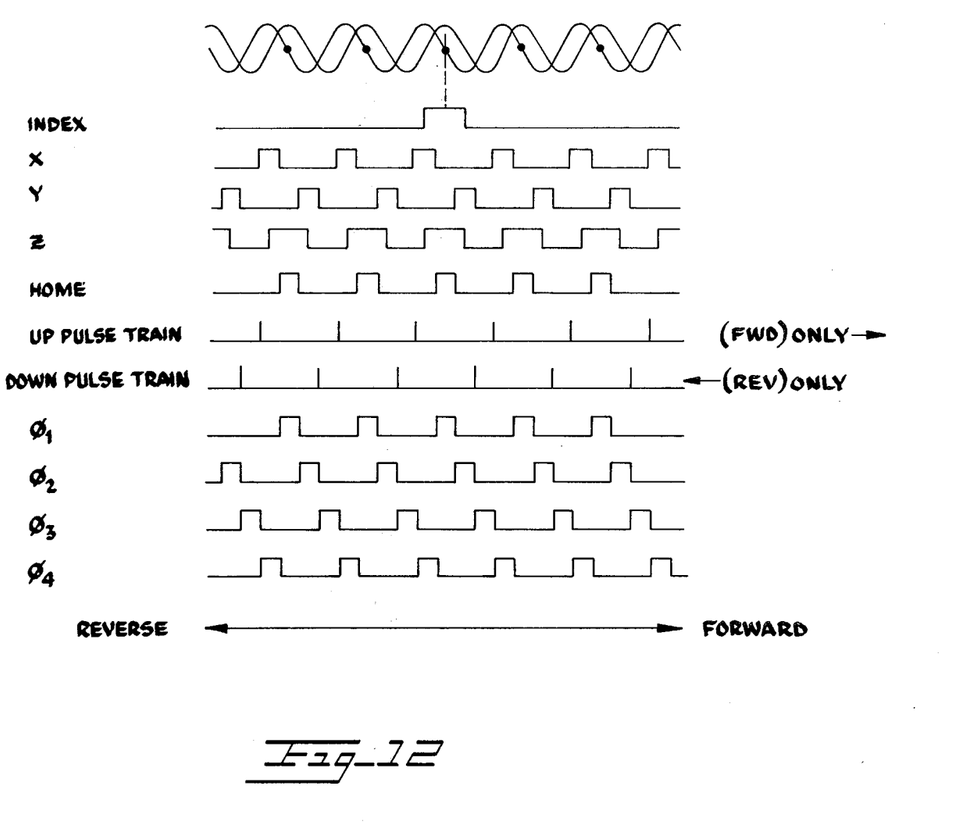
FIGS. 12 and 13 are wave form diagrams illustrating the operation of the FIG. 8 system.

Light receptors 57–59 are conventional photocells each having a cathode coupled to common ground, together with the cathode of light emitting diode 52. The anode of photocell 57 is coupled directly, and indirectly by an inverter 62, to the input of a signal conditioning unit 63. Similarly, the anode of photocell 58 is coupled both directly and indirectly by an inverter 64, to signal conditioning unit 63. Signal conditioning unit 63 is a conventional device which independently amplifies the individual signals $V_1$, $V_1$, $V_2$, and $V_2$, translates the magnitude of the amplified signals to levels symmetrical about zero voltage, and adjusts the individual signals for a peak-to-peak amplitude of 20 volts. The thus-conditioned output signals from signal conditioning unit 63, designated $V'_1$, $V'_1$ and $V'_2$ are individually coupled to the individual inputs of a plurality of Schmitt trigger units 65, 66 and 67, each of which generates a positive going pulse designated X, Y and Z, respectively, whenever the input voltage thereto exceeds a predetermined threshold level described below. Schmitt trigger circuits 65, 66 are configured to produce a pulse output when the magnitude of the voltage input thereto rises to 0.707 times the maximum amplitude of the input wave form. Schmitt trigger circuit 67 is configured to generate a positive pulse output whenever the input voltage thereto exceeds zero volts in the positive direction. The X, Y and Z position signal pulse trains thus generated, which are illustrated in FIG. 12, are applied to a print wheel position counter shown in FIG. 10 and are used to derive control signals for the purpose described below.

Figure 14:
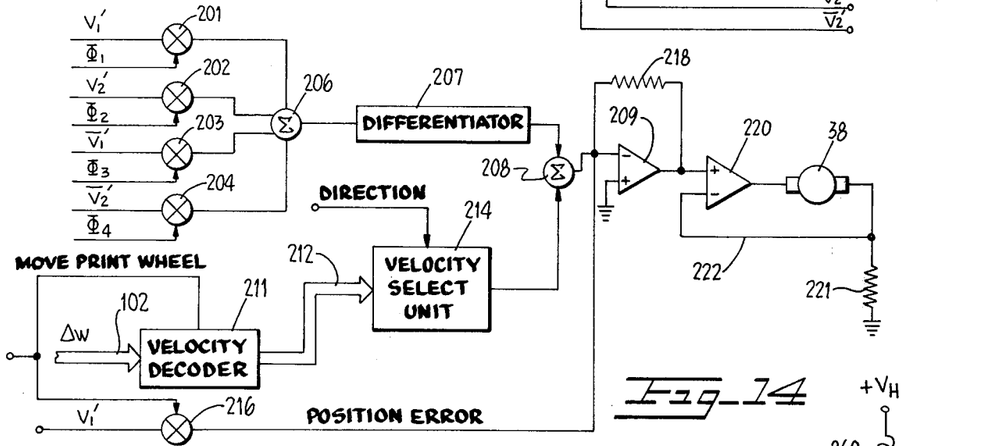
FIG. 14 is a schematic block diagram of the print wheel drive unit.

Output signals $V'_1$, $V'_1$, $V'_2$ and $V'_2$ are also coupled to a print wheel drive unit shown in FIG. 14 for a purpose to be described.

An important feature of the preferred embodiment is the self-regulated control of the intensity of the light emitted by source 52, 53. THe aode of intensity control photocell 59 is coupled to a first input of a differential amplifier 68, the remaining input to which is a reference voltage derived from ground by a zener diode 69. The output of amplifier 68 is coupled through a load impedance 70 to the control element of a transistor 71 used to regulate the magnitude of the voltage applied from a reference voltage V to the anode of source 53. In operation, as the light output of sources 52 or 53 varies, this cchange in intensity is sensed by photocell 59, thereby altering the voltage across this element. This change in potential is sensed by differential amplifier 68 so that the bias on the control element of transistor 71 is changed. This changed bias causes the magnitude of the voltage applied to the anode of source 53 to be changed accordingly to maintain the light output substantially constant.

A similar encoder disc and self-regulated opto-electronic position sensor is provided for carriage D.C. motor 32 to generate position pulses for identifying the instantaneous position of carriage assembly 14 along the print axis. Since the elements are substantially identical to those already described with reference to FIGS. 2, 3 and 4–7, further details are omitted to avoid prolixity.

Figure 8:
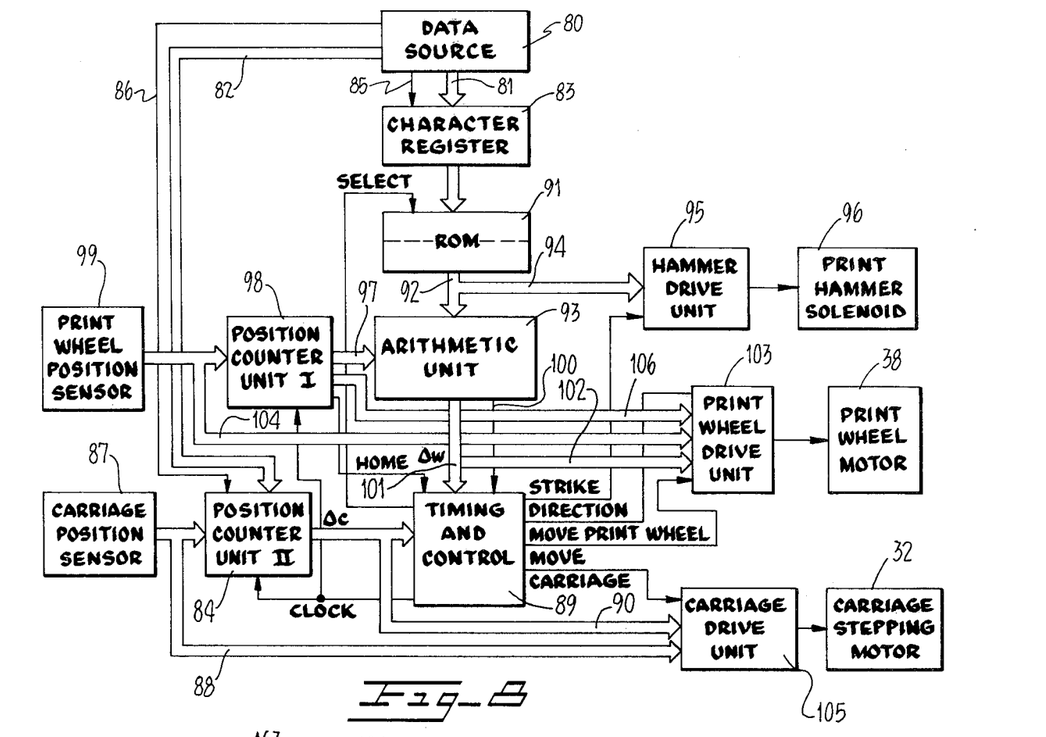
FIG. 8 is a block diagram of the electronic control system.

FIG. 8 shows the electronic control system in the preferred embodiment. Character and carriage spacing data generated by a conventional data source, such as the output buffer register 80 of a digital computer, is coupled by a first and second data bus 81, 82 to a character register 83 and a position counter unit 84. Character register 83 is a conventional device capable of accepting multi-bit binary characters and storing same in response to the application of a strobe pulse on strobe line 85. In the preferred embodiment, the characters are seven bit ASCII code characters. Position counter unit 84 is a conventional counter capable of accepting multi-bit information specifying the number of carriage steps between adjacent printed characters in response to the application of a strobe pulse on strobe 86. Position counter unit 84 has an input to which the carriage position sensor signals are applied from carriage position sensor unit 87 for the purpose of stepping position counter unit 84. The carriage position sensor signals are also coupled to a carriage drive unit described below via a bus 88. The output of position counter unit 84, termed ΔC, is coupled to an input of a timing and control unit 89 and also to the carriage drive unit via a bus 90.

The output of character register 83 is coupled to the data input of a read only memory, or ROM, 91 along with a control signal from timing and control unit 88 termed SELECT. ROM 91 is a conventional 256 by 8 bit unit which is functionally divided into two halves schematically portrayed by the broken line. The first half is used to store the two's complement of the position on the print wheel 40 of the characters comprising the print wheel font. The second half is used to store hammer intensity characters which specify the desired intensity with which the print hammer is to be actuated for the individual characters in the font. The SELECT signal specifies the portion of the ROM, i.e., first or second portion, from which a character is to be read.

Figure 10:
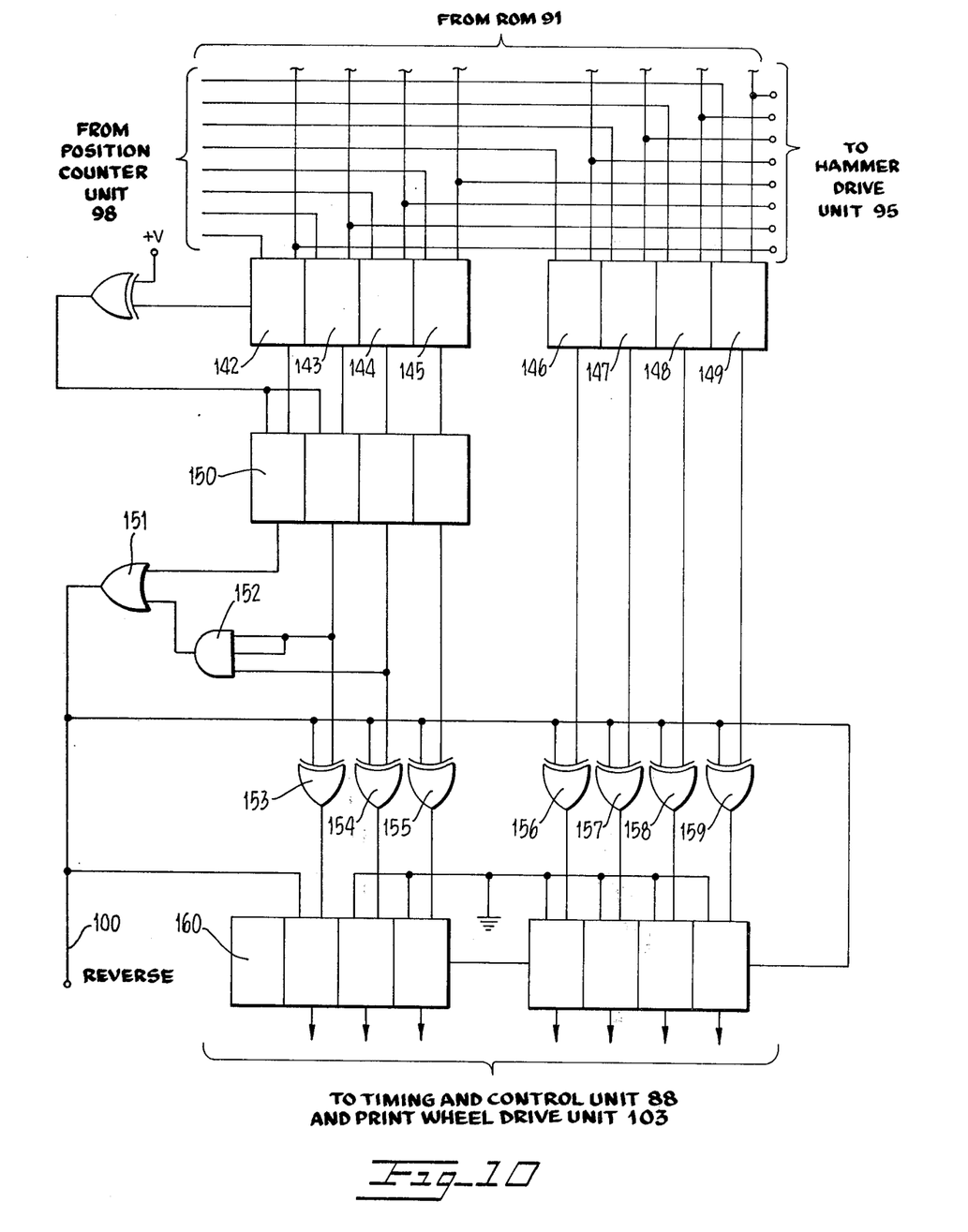
FIG. 10 is a diagram of the arithmetic unit of FIG. 8.

The character position characters are coupled by a data bus 92 to a first input of an arithmetic unit 93 illustrated in detail in FIG. 10. The hammer intensity characters are coupled by a data bus 94 to a hammer drive unit 95 shown in detail in FIG. 15 along with a control signal designated STRIKE from timing and control unit 89. The output of hammer drive unit 95 controls the actuation of print hammer solenoid 96.

Figure 9:
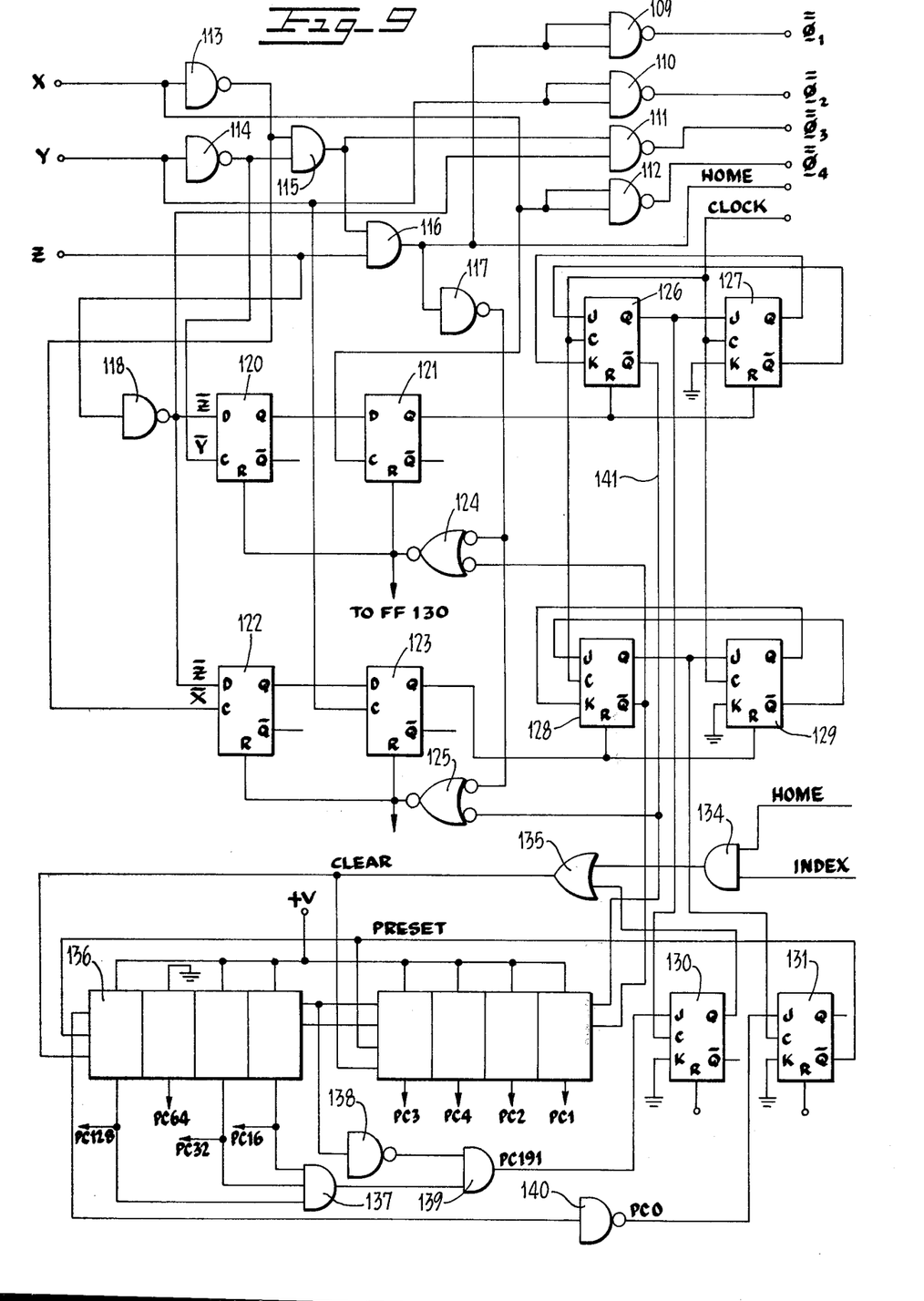
FIG. 9 is a diagram of the print whel position counter unit of FIG. 8.

The remaining input to arithmetic unit 93 is obtained via a data bus 97 from a position counter unit 98 illustrated in detail in FIG. 9. Position counter unit 98 specifies the instantaneous position of print wheel 40 during operation in response to the application of the X, Y, Z position pulses from wheel position sensor 99, described above, and clock signals from timing and control unit 89.

Arithmetic unit 93 initially compares the output of position counter unit 98, specifying the initial position of print wheel 40, with the character output from ROM 90 to determine the direction of rotation providing the shortest angular travel path required to align the character pad bearing the desired character to be printed with the striking end of the solenoid hammer. A signal specifying the optimum rotational direction is coupled via a conductor 100 to timing and control unit 89. Arithmetic unit 93 also continuously compares the state of position counter unit 98 with the character from the first half of ROM 91 and generates a multi-bit signal representative thereof, which is coupled via a data bus 101 to timing and control unit 88 and via data bus 102 to a print wheel drive unit 103.

In addition to the SELECT and STRIKE signals noted above, timing and control unit 89 generates a DIRECTION control signal and a MOVE PRINT WHEEL signal, which are coupled to print wheel drive unit 103 used to control the rotation of print wheel DC motor 38.

Timing and control unit 89 also generates CLOCK signals for clocking position counter units 84, 98 and a control signal termed MOVE CARRIAGE which is coupled to the input of a carriage drive unit 105 essentially similar to print wheel drive unit 103. The output of carriage drive unit 105 is used to control the incremental rotation of carriage DC motor 32.

Figure 13:
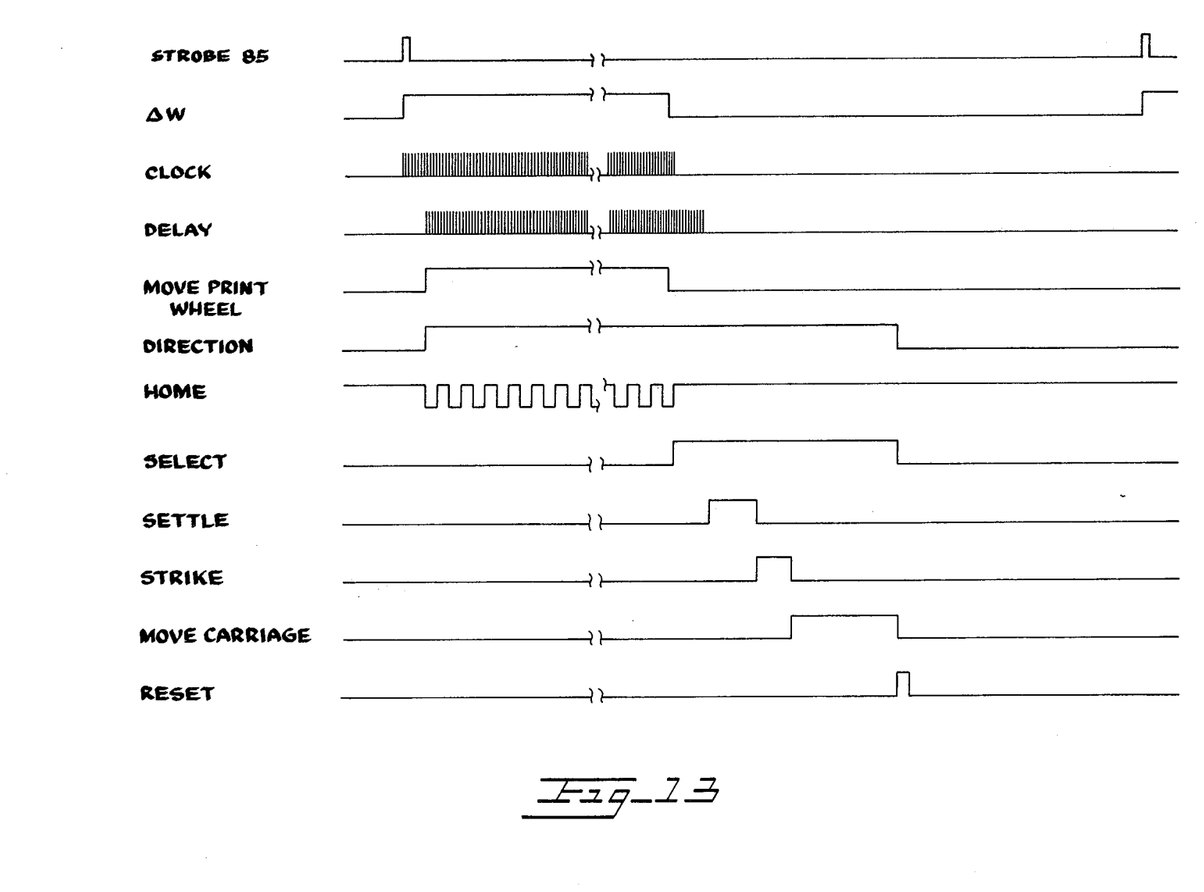

FIG. 9 illustrates position counter 98. This unit includes first and second pairs of control flip-flops 120, 121 and 122, 123 respectively. The first pair of control flip-flops 120, 121 control the operation of an up-pulse generator comprising a pair of flip-flops 126, 127 and also enable a first conditioning flip-flop 130. The second pair of control flip-flops 122, 123 similary enable the operation of a down-pulse generator 128, 129 and enable the operation of a second conditioning flip-flop 131. Both the up-pulse generator and the down-pulse generator are clocked by an external clock generated by timing and control unit 89, which in the preferred embodiment is a 500 KHz clock signal train as shown in FIG. 13. The up-pulse and down-pulse generators respectively increment and decrement a position counter 136. In the preferred embodiment, position counter 136 is a scale of 256 counter modified as shown to operate as a scale of 192 counter which is either cleared to zero after reaching the count of 191 when incremented by the up-pulse generator or is preset to a count of 191 after passing through zero when decremented by the down-pulse generator.

When reference to FIG. 12, in operation in response to the receipt X, Y, and Z control signals from the print wheel position sensor 99 (which it will be remembered are generated whenever print wheel is incrementally rotated) one of the two pairs of control flip-flops 120, 123 enables the associated pulse generator, depending on the direction of rotation of print wheel 40. When rotated in a first direction, flip-flop 120 is set by the concurrence of Z true and positive Y transition, after which a positive transition of X causes flip-flop 121 to be set, thereby releasing flip-flops 126, 127 for clocking by the incoming clock signal. In addition, the reset clamp is removed from conditioning flip-flop 130 by the set condition of flip-flops 120, 121.

Thereafter, the next four clock pulses cycle the up-pulse generator through four successive binary states, resulting in the generation of an up-pulse on lead 141 which is applied to the incrementing input of counter 136. Thereafter, when HOME transitions true at the output of AND gate 116, flip-flops 120, 121 are reset which disables up-pulse generator flip-flops 126, 127 and conditioning flip-flop 130 until the next proper sequence of Z, Y, and X signals occurs.

If counter 136 held a count of 191 before flip-flop 126 was set, a condition indicated by decoding gates 137–139, conditioning flip-flop 130 is set by the flip-flop 126 Q true transition and counter 136 is cleared to zero by the resulting output signal from OR gate 135. Counter 136 is also cleared to zero by the signal generated by OR gate 135 in response to the generation of an output signal from AND gate 134 when HOME and INDEX signals are both true.

Operation of the position counter unit 98 in the down-mode is substantially similar to that described above, with flip-flops 122, 123 enabling the operation of down-pulse generator flip-flops 128, 129 and conditioning the operation of flip-flop 131. In this case, however, flip-flop 122 is set by Z true and a subsequent transition of X true, while flip-flop 123 is set by Y true occurring after flip-flop 122 is set. The resulting release of down-pulse generator flip-flops 128, 129 causes the generation of a single down-pulse on lead 141' which decrements counter 136. In addition, if counter 136 holds a count of zero signified by decoder gate 140 when flip-flop 128 transitions true, counter 136 is preset by conditioning flip-flop 131 to hold a count of 191. After counter 136 has been decremented, flip-flops 122, 123 and 131 are reset by the appearance of a HOME true signal.

Position counter unit 98 also includes four inverting AND gates 109–112 for generating the $\phi_1$, $\phi_2$, $\phi_3$, and $\phi_4$ control signals also shown in FIG. 12 which are coupled to print wheel drive unit 103 for a purpose to be described.

The print wheel position counter 136 outputs, viz. PC1–PC128 are each coupled to a first input of a different one of a plurality of individual comparator units 142–149 of arithmetic unit 93 shown in FIG. 10, together with the desired print wheel position character from ROM 91 from the first portion thereof. The respective outputs from individual comparators 142–149 are sampled in the following manner.

Initially the four most significants bits output from comparators 124–145 are sampled in a four-bit binary adder 150 to determine whether the difference between the position of the character desired to be printed specified by ROM 91 and the instantaneous wheel position is greater than the number 96. If so, control gate 151 generates an output pulse, termed REVERSE, which conditions a plurality of exclusive OR gates 153–159 to enable adder 160 to generate the two's complement of the difference signal from comparators 142-149 noted above. In addition, the REVERSE signal is coupled to timing and control unit 89 to condition this unit to generate a reverse DIRECTION signal which, as noted above, is coupled to the print wheel drive unit 103.

If the difference signal is not greater than 96, the difference character is simply transferred through adder 160.

Figure 11:
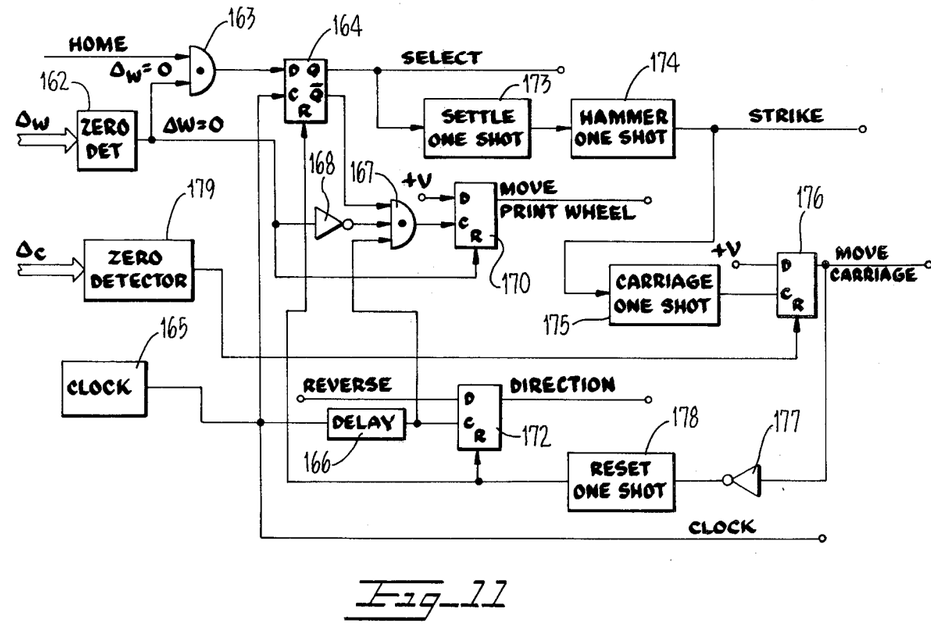
FIG. 11 is a block diagram of the timing and control unnit of FIG. 8.

The difference character termed Δ W at the output of adder 160 is coupled to a zero detector 162 in timing and control unit 89 shown in FIG. 11. Zero detector 162 is a convention unit for generating a signal of predetermined level whenever the input thereto is zero. The output of zero detector 162 is coupled to a first input of an AND gate 163, the remaining input to which is HOME signal from position counter unit 98. The output of AND gate 163 is coupled to the data input of a D-type flip-flop 164 having a clock input coupled to the output of a clock generator 165.

The output of clock 165 is also coupled through a conventional delay device 166 to a first input of an AND gate 167, the remaining inputs to which are the output of zero detector 162 inverted by a conventional inverter and the Q output of flip-flop 164. The output of AND gate 167, which comprises a delayed signal indicating that Δ W equals zero, is coupled to the clock input of a D-type flip-flop having the data input coupled to a reference voltage V. The reset input to flip-flop 170 is obtained from the output of zero detector 162, which causes flip-flop 170 to reset when Δ W transitions false. The output of flip-flop 170 is the control signal MOVE PRINT WHEEL which, as noted above, is coupled to an input of print wheel drive unit 103.

The output of delay unit 166 is also coupled to the clock input of a D-type flip-flop 172 having a data input coupled to the REVERSE control signal from arithmetic unit 93. Flip-flop 172 is set whenever REVERSE signal is true to generate the DIRECTION signal which is also coupled to print wheel drive unit 103 to control the direction of rotation of print wheel 40.

The output of flip-flop 164, which is a bi-level SELECT signal used to designate the reading of a character from either the first or second portion of ROM 90, is also coupled to the input of a conventional one shot 173 which provides a settling time for the mechanical elements, e.g. print wheel 40, prior to the impression of a print symbol against the print medium. The output of SETTLE one shot 173 is coupled to the input of a HAMMER one shot 174 which generates a STRIKE control signal for triggering operation of the hammer drive unit 95. The output of hammer one shot 174 is coupled to the input of a CARRIAGE one shot 175 whose output is coupled to the clock input of a D-type flip-flop 176 used to enable the carriage DC motor. The reset input to flip-flop 176 is obtained from the output of a zero detector 179, similar to zero detector 162, which generates an output signal whenever the carriage position counter unit 184 has been incremented to the zero state, indicating that the carriage is in the next proper print position. The output of carriage one shot 175 is also coupled via an inverter 177 to the input of a reset one shot 178 which generates a reset pulse to reset flip-flops 164 and 172 after one shot 175 times out.

In operation, with the carriage in the print position, in response to the generation of a strobe pulse on strobe line 35 (FIG. 8) the next desired character to be printed is coupled via data bus 81 to character register 83 where it remains until the appearance of the next strobe pulse. With SELECT flip-flop 164 initially reset (FIG. 11), the two's complement of this desired character is read out from ROM 91 and coupled to comparators 142-149 in arithmetic unit 93, together with the output of print wheel position counter 136 in position counter unit 98. A comparison of the two characters is made and flip-flop 172 of timing and control unit 89 is set to the binary configuration corresponding to the optimum direction of rotation of print wheel 40. Substantially simultaneously, flip-flop 170 is set by Δ W ≠ zero via zero detector 162, inverter 168, and AND gate 167, thereby enabling rotation of print wheel 40. The output of adder 160 of arithmetic unit 93 is sampled by zero detector 162 and print wheel 40 is permitted to continue to rotate until Δ W equals zero, indicating that the print wheel is in the ready position.

When Δ W equals zero, flip-flop 170 is reset to terminate rotation of print wheel 40 and the next HOME pulse permits flip-flop 164 to be set by clock 165 to change the level of the SELECT signal, thereby specifying character read-out from the lower portion of ROM 91 and blocking AND gate 167. The hammer intensity character is thereafter coupled to hammer drive unit 95 after which hammer one shot 174 generates a STRIKE command signal, which results in the actuation of the print hammer solenoid 96. After hammer one shot 174 times out carriage one shot 175 generates a CARRIAGE pulse which sets flip-flop 176 to enable the carriage to be translated to the next character position. As the carriage is translated to this next print position, the position counter unit 84 is decremented by the carriage position sensor until Δ C equals zero. When Δ C equals zero, zero detector 179 resets flip-flop 176 to terminate further carriage travel. Further operation proceeds in the manner already described.

FIG. 14 illustrates print wheel drive unit 103. As seen in this FIG., a plurality of electronic transfer switches 201-204 are provided, each having a transfer input terminal coupled respectively to reference signals $V'_1$, $V'_2$, $V'_1$, $V'_2$ respectively and a control input terminal coupled to reference signals $\phi 1$, $\phi 2$, $\phi 3$, $\phi 4$, respectively; the reference signals being supplied by print wheel position sensor 99 and position counter 98. The transfer output terminals of switches 201-204 are coupled through a summing network 206 to the input of a conventional differentiator circuit 207. The output of differentiator 207 is coupled to a first input of a summing network 208, the output of which is coupled to a first input of a differential amplifier 209.

Δ W signals are coupled via data bus 102 to the input of a velocity decoder 211 having an enabling input coupled to the move print wheel control signal from timing and control unit 89. Velocity decoder 211 is a conventional circuit having a plurality of decoder gates responsive to the 7 bit binary code Δ W character for generating control signals representative of a desired motor velocity. These control signals are coupled via data bus 212 to the input of a velocity select unit 214. Velocity select unit 214 has an enabling input coupled to the DIRECTION control signal from timing and control unit 89. Velocity select unit 214 is a conventional circuit which generates a voltage having a level representative of the desired motor velocity in response to the control signals input thereto from velocity decoder 211. The output of velocity select unit 214 is coupled to the remaining input of the summing junction 208.

MOVE PRINT WHEEL control signal from timing and control unit 89 is also coupled to the control electrode of an electronic transfer switch 216 having a transfer input coupled to $V'_1$ reference signals supplied by print wheel position sensor 99. Transfer switch 216 is controlled in such a manner that the $V'_1$ position signal is coupled to the transfer output terminal thereof whenever the MOVE PRINT WHEEL control signal is false (i.e. when the print wheel is in a stationary mode). The transfer output of switch 216, designated POSITION ERROR, is coupled to the first input of differential amplifier 209. The remaining input to differential amplifier 209 is coupled to ground reference potential.

The output of the differential amplifier 209 is coupled back by a resistance 218 to the first input of driver amplifier 220. The output of driver amplifier 220 is coupled to print wheel motor 38 and is used to control the actuation thereof. The motor driving circuit is completed by a resistance 221 coupled to ground reference potential and feedback loop 222 coupled to the remaining input of driver amplifier 220.

Print wheel drive unit 103 comprises an electronic servo control circuit for controlling the operation of print wheel motor 38 in two modes: a position mode and a rate mode. In the position mode, the static position of print wheel 40 is monitored by photocell 57 to maintain the position of the wheel coincident with the negative going zero crossing point of voltage level $V_1$ (FIG. 12). For this purpose, $V'_1$ position signal is coupled via transfer switch 216 to differential amplifier 209, which generates a correction voltage of proper polarity and magnitude whenever print wheel 40 strays from this position. The resulting error voltage is amplified by driver amplifier 220 and applied to motor 38 to re-position print wheel 40.

In the rate mode, signified by MOVE PRINT WHEEL control signal true, transfer switch 216 is disabled and the velocity motor 38 is controlled by the difference between the instantaneous motor velocity and the angular distance the wheel must travel in order to reach the proper print position, signified by $\Delta W$. This insures that the velocity of the motor 38 in any given instant tracks closely the optimal acceleration - deceleration curve of the servo system so that the wheel may be quickly positioned to the proper print position without positional overshoot.

The instantaneous velocity of the print wheel 40 is monitored by photocells 57,58 andd represented by reference signals $V'_1$, $V'_1$, $V'_2$, $V'_2$ (FIG. 12). These signals are sequentially sampled by transfer switches 201-204 controlled by signals $\phi_1$-$\phi_4$ so that during the interval from 315° to 45° $V'_1$ is coupled through summing network 206 to the input of differentiator 207; $V'_2$ is coupled thereto during the interval from 45° to 135°; $V'_1$ is coupled thereto during the interval from 135° to 225°; and $V'_2$ is coupled thereto during the interval from 225° to 315°. Differentiator 207 in response to the input signal applied thereto generates a reference output signal which is continuous over the entire 360° interval between adjacent null points and which is representative of the instantaneous velocity of print wheel 40.

At the same time $\Delta W$ signals are decoded by velocity decoder 211 which enables one of nine velocity select lines which are coupled to velocity select unit 214. Velocity select unit 214 in response thereto generates a voltage reference signal which is proportional to the angular position error. The resulting reference signal is coupled to the summing network 208.

The two reference signals from differentiator 207 and velocity select unit 214 are combined in summing network 208 and used to control the speed of motor 38 until the two reference signals conterbalance each other. When the net output of summing network 208 is zero, the velocity of motor 38 is constant.

As motor 38 turns, the angular position error diminishes and $\Delta W$ changes accordingly, thereby selecting a different one of the nine velocity select lines in bus 212. In response thereto, velocity select unit 214 generates a reference voltage signal having a different magnitude corresponding to the altered angular position error, with the result that the velocity of motor 38 is altered accordingly. The velocity and position error are thus continuously monitored until print wheel 40 is within the boundary of the appropriate null position.

With reference to FIG. 11, occurence of this position is signified by $\Delta W$ equals zero which resets flip-flop 170, thereby terminating the rate mode and re-instituting the position mode. Final positioning of print wheel 44 in the null position is controlled by reference signal $V'_1$ which is transmitted by a transfer switch 216 enabled by MOVE PRINT WHEEL false to the input of differential amplifier 209.

In order to permit the print wheel 40 to settle to this null position, settle one shot 173 provides an approximately two millisecond delay before hammer one shot 74 is actuated. As noted above, actuation of hammer one shot 74 causes the generation of a strike pulse for hammer drive unit 95.

Figure 15:
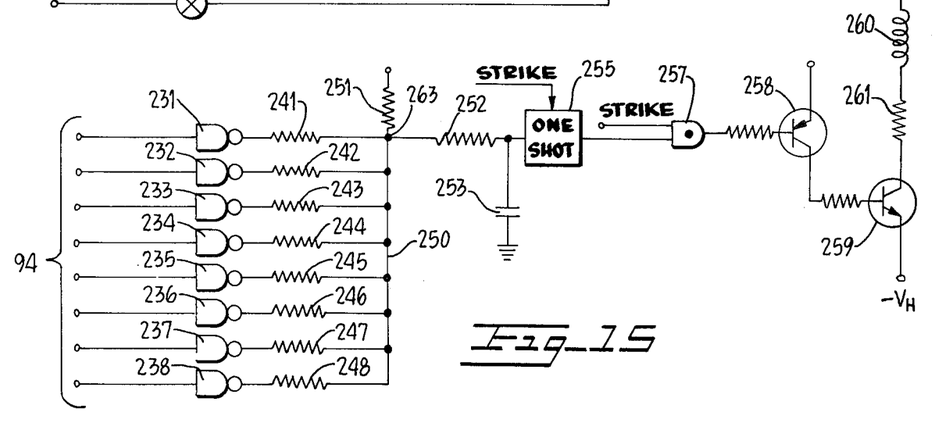
FIG. 15 is a circuit diagram of the hammer drive unit.

With reference to FIG. 15, hammer drive unit 95 comprises a plurality of parallel branches of inverting AND gates 231-238 and resistances 241-248, each branch having an input terminal coupled to a different one of the conductors in bus 94 and an output terminal coupled to a common conductor 250 coupled through a resistance 252 to a source of reference voltage. Common terminal 250 is also coupled to an R-C network comprising a resistor 252 and a capacitor 253, the network being coupled to the time constant input of a conventional one shot circuit 255. The STRIKE signal from timing and control unit 89 is coupled to the trigger input of one shot 255, which generates an output pulse whose length is proportional to the initial voltage applied at the time constant input thereto after the appearance of the STRIKE signal. The output of one shot 255 is coupled by an AND gate 257 enabled by STRIKE control signal to the control input of a control transistor 258. Control transistor 258 is coupled to a power transistor 259 having the emitter-collector junction coupled in series with hammer solenoid coil 260 of print hammer solenoid 96 by a resistor 261. The free terminal of coil 260 is coupled to a high voltage reference source $+V_H$; the emitter of transistor 259 is coupled to a second high voltage reference source $-V_H$.

In the operation, the generation of a particular hammer intensity character on bus 94 by the application of a SELECT signakl to the input of ROM 91 causes the selection of predetermined ones of the horizontal branches having inverting AND gates 231-238 and resistances 241-248. The value of resistances 241-248 are preselected to establish a predetermined voltage level at junction 263 for each particular horizontal branch thus selected. Capacitor 253 charges up this voltage level through resistance 252 and one shot 255 is triggered by the appearance of the STRIKE control signal applied to the trigger input thereto. The output of one shot 255 is coupled through AND gate 257 enabled by STRIKE control signal and causes control transistor 258 to switch on power transistor 259, thereby causing the print hammer solenoid 96 to be actuated. Solenoid 96 remains actuated until one shot 255 times out, which occurs after a variable interval determined by the hammer intensity character input. In the preferred embodiment, this interval is variable from about 1.5 to about 3.0 milliseconds. As will be apparent to those skilled in the art, the interval may be lengthened or shortened by changing the values of resistors 241–248 to meet the requirements of a particular application.

Rotary printer control systems constructed in accordance with the teachings of the invention provide extremely flexible control over the hammer striking intensity, by virtue of the fact that each character in the first portion of ROM 90 can have a unique hammer intensity character associated therewith. In the preferred embodiment, e.g., each of 128 print characters in the first portion of ROM 90 has a corresponding individual hammer intensity character in the second portion thereof. The system may be readily expanded to accommodate applications requiring more than 128 characters by merely replacing the ROM with another having a greater storage capacity.

A further advantage of the invention resides in the capacity to accommodate character fonts having different numbers of characters. As disclosed, the preferred embodiment is capable of handling character fonts having up to a maximum of 192 individual print characters. To expand the system beyond this capacity, the decoding logic for print wheel position counter 136 is modified to provide the CLEAR and PRESET functions at appropriate count intervals and the arithmetic unit logic elements 151, 152 which perform the optimum angular direction test are similarly modified to generate the REVERSE signal whenever the difference between the character to be printed and the starting address of the print wheel is greater than N/2. where N is the total number of font characters.

A further advantage of systems constructed in accordance with the teachings of the invention resides in the print wheel sensor unit and the carriage position sensor unit which are both immune to variations in the light intensity output of the light source, so that the print wheel and carriage position reference signals are always precisely defined.

Lastly, rotary printer control systems constructed in accordance with the teachings of the invention provide extremely precise positioning of the print wheel and carriage in the position mode, while at the same time controlling movement of the print wheel and carriage to successive print positions in the rate mode in an optimal manner so that the motor follows the optimal acceleration-deceleration curve of the servo system and comes to rest without positional overshoot.

While the above provides a full and complete disclosure of the invention, various modifications, alternate constructions and equivalents may be employed without departing from the true spirit and scope of the invention. Therefore, the above description and illustrations should not be construed as limiting the scope of the invention, which is defined by the appended claims.

What is claimed is:

1. For use in a rotary wheel printing system having a translatable carriage; means for translating said carriage along a print line, a rotary print wheel mounted on said carriage, said rotary print wheel having a plurality of individual print characters distributed about the radial center thereof; means for rotating said print wheel; means for impressing said print characters against a print member; first position indicating means for generating signals representative of the instantaneous position of said print wheel, said first position indicating means including an encoder disc mounted for rotation with said print wheel and having a plurality of alternately arranged opaque and translucent portions arranged in a substantially circular timing track about the radial center of said disc; and means responsive to said print wheel position signals for actuating said imprinting means; the improvement wherein said first position indicating means includes a first light source mounted adjacent a first surface of said disc, a plurality of light sensitive devices mounted adjacent the opposite surface of said disc and responsive to the angular displacement of said opaque and translucent timing track portions when said print wheel is rotated for generating a pair of position trains having a substantially constant phase difference, and first feedback means for maintaining the intensity of said light source substantially constant, said first feedback means including power means for applying electrical power to said light source; first light sensitive means disposed adjacent said opposite side of said disc at a position to continuously intercept light radiation emitted by said first light source for generating an electrical signal representative of the intensity of said light radiation adjacent said light sensitive devices; comparison means for comparing said intensity signal with a standard signal representative of a pre-established desired light intensity; means for generating a correction signal when said intensity signal differs from said standard signal; and means for coupling said correction signal to said power means to vary the magnitude of said light intensity to re-establish said desired light intensity.

2. The system of claim 1 wherein said light source comprises a light emitting diode and said comparison means comprises a differential amplifier having a first input coupled to said standard signal and a second input coupled to the output of said intensity signal generating means.

3. The system of claim 1 wherein said phase difference is substantially 90°.

4. The system of claim 1 wherein said carriage translating means includes a motor having a rotatable shaft and means for converting the motion of said rotatable shaft to translational movement of said carriage; and furhter including second position indicating means for generating signals representative of the instantaneous position of said carriage, and means responsive to said carriage position signals for controlling the actuation of said carriage translating means; said second position indicating means including an optical encoder disc secured to said rotatable shaft and having a plurality of alternately arranged opaque and translucent portions disposed about the radial center of said disc to form a substantially circular timing track; a second light source mounted adjacent a first surface of said optical encoder disc, at least one light sensitive device mounted adjacent the opposite surface of said optical encoder disc and responsive to the angular displacement of said opaque and translucent timing track portions of said optical encoder disc when said disc is rotated for generating a position signal train, and second feedback means for maintaining the intensity of said light source substantially constant, said second feedback means including power means for applying electrical power to said second light source; second light sensitive means disposed adjacent said opposite surface of said optical encoder disc at a position to continuously intercept light radiation emitted by said light source for generating an electrical signal representative of the intensity of said light radiation adjacent said at least one light sensitive device; comparison means for comparing said intensity signal with a standard signal representative of a pre-established desired light intensity; means for generating a correction signal when said intensity signal differs from said standard signal; and means for coupling said correction signal to said power means to vary the magnitude of said light intensity to re-establish said desired light intensity.

5. The system of claim 4 wherein said light source comprises a light emitting diode and said comparison means comprises a differential amplifier having a first input coupled to the output of said intensity signal generating means.

6. The system of claim 1 wherein said first light source comprises first and second light-generating elements coupled in series to said power means, and wherein said first light sensitive means is disposed in a position to continuously intercept light radiation emitted by at least one of said first and second light generating elements.

7. The system of claim 4 wherein said second light source comprises third and fourth light generating elements coupled in series to said power means, and wherein said second light sensitive means is disposed in a position to continuously intercept light radiation emitted by at least one of said third and fourth light generating elements.

8. For use in a rotary wheel printing system having a translatable carriage; means for translating said carriage along a print line; a rotary print wheel mounted on said carriage, said rotary print wheel having a plurality of individual print characters distributed about the radial center thereof; means for rotating said print wheel; means for impressing said print characters against a print medium; first position indicating means for generating signals representative of the instantaneous position of said print wheel; means adapted to be coupled to an external data source for receiving a multi-bit character representative of a character to be printed; and means responsive to said print wheel position signals and the character stored in said receiving means for actuating said impressing means; the improvement wherein said last-named means includes a memory device having a first portion for storing a plurality of individual multi-bit characters each representative of thre location on said print wheel of a different one of said print characters and a second portion for storing a plurality of individual hammer intensity characters each representative of the intensity with which the associated print character in said first portion is to be impressed against said print medium, different ones of said hammer intensity characters representing different intensities, means for sequentially fetching the multi-bit location character and the associated hammer intensity character specified by the character stored in said receiving means, and means coupled to said memory means for converting the individual fetched hammer intensity characters to corresponding actuation signals for said impressing means having a magnitude dependent upon the intensity assigned to the corresponding hammer intensity character.

9. The system of claim 8 wherein said impressing means comprises a solenoid actuated hammer, and said converting means comprises a hammer drive unit for supplying said actuation signals to said solenoid actuated hammer.

10. The system of claim 9 wherein said hammer drive unit includes means for generating actuation signals each having a period of duration determined by the magnitude of a control signal coupled thereto, and means coupled to the output of said memory device for generating said control signal having a magnitude determined by the value of given hammer intensity character.

11. An electronic control system for use with a rotary wheel printer having a translatable carriage; means for translating said carriage along a print line; a rotary print wheel mounted on said carriage, said rotary print wheel having a plurality of individual print symbols distributed about the redial center thereof; means for rotating said print wheel; means for impressing said print symbols against a print mediumm; first position indicating means for generating signals representative of the instantaneous position of said print wheel; and second position indicating means for generating signals representative of the instantaneous position of said carriage, said system comprising:

first storage means adapted to be coupled to an external data source for storing a multi-bit character representative of a symbol to be printed;

a print wheel position counter unit adapted to be coupled to said first position indicator means for converting said position signals to a multi-bit character representative of the instantaneous position of said print wheel;

a memory device coupled to said first storage means and having a first portion for storing a plurality of multi-bit characters representative of the address on said print wheel of each of said symbols, a second portion for storing a corresponding plurality of hammer intensity characters each associated to a different one of said plurality of address characters in said first portion, and means responsive to an access control signal for sequentially reading out a multi-bit address character and the associated hammer intensity character specified by a character stored in said first storage means;

an arithmetic unit coupled to the output of said print wheel position counter unit and said memory unit for generating a multi-bit differential signal representative of the difference between said symbol address character and said instantaneous print wheel position character, and a reference signal indicating the optimum direction of rotation of said print wheel;

drive means coupled to the output of said memory means for generating variable magnitude signals for said impressing means in accordance with the value of said hammer intensity character associated to said address character corresponding to said multi-bit character in said first storage means; and timing and control means coupled to the output of said print wheel position counter unit and said arithmetic unit for generating control signals for specifying the desired direction of rotation of said print wheel, for controlling said sequential reading out means and for enabling the actuation of said means for rotating said print wheel, said timing and control means including first means for generating said access control signal to effect read-out of said multi-bit address character and subsequent read-out of said associated hammer intensity character when said differential signal indicates that said print wheel is correctly aligned for printing a symbol represented by said character stored in said first storage means, second means for enabling said impressing means when said differential signal indicates that said print wheel is correctly aligned for printing a symbol represented by said character stored in said first storage means, and third signals for enabling said carriage translating means after said impressing means has been enabled and a symbol has been printed to translate said carriage wheel said print line to a succeeding location.

12. The combination of claim 11 wherein said print wheel rotating means includes a bidirectionally rotatable motor; said first position indicating means includes means for generating a first pair of cyclic print wheel position ignals having substantially coextensive periods and a phase displacement of substantially 90°, means for deriving a second pair of cyclic print whel position signals comprising the inverses of said first pair, and means for deriving from one of said pairs of print wheel position signals four mutually exclusive phase control signals each defining a different quadrant of the period of one of said signals of said pairs;

and wherein said system further includes a servo control system adapted to be operated in a position mode and a rate mode and having an output coupled to said motor, said servo control system including:

means coupled to said servo control system output for generating an error signal, means having a plurality of inputs each coupled to a different one of said first and second pairs of print wheel position signals and said four phase control signals for generating a first reference signal representative of the instantaneous velocity of said print wheel, means having a plurality of input terminals coupled to said arithmetic unit and said timing and control means for generating a second reference signal having a magnitude specifying a predetermined desired velocity in accordance with the value of said multi-bit differential signal generated by said arithmetic unit and a predetermined polarity in accordance with said control signal specifying the desired direction of rotation generated by said timing and control means, means coupled to said first and second reference signal generating means for generating a first error signal generating means input signal for controlling error signal generation during the rate mode of operation, and means having a first input coupled to said timing and control and a second input coupled to said first position indicating means for generating a second error signal generating means input signal for controlling error signal generation during the position mode of operation.

13. The combination of claim 12 wherein said first reference signal generating means comprises a plurality of transfer switches each having a transfer input coupled to a different one of said first and second pairs of print wheel position signals, a transfer output, and a control input coupled to a different one of said four phase control signals, a summing means having a plurality of inputs each coupled to a different one of said transfer outputs and an output terminal, and a differentiator means having an input coupled to the output of said summing means.

14. The combination of claim 12 wherein said second reference signal signal generating means comprises a velocity decoder having a plurality of input terminals each coupled to a different one of said bits of said multi-bit differential signal, a control input coupled to said enabling signal for said print wheel generated by said timing and control means, and a plurality of output terminals; and a velocity select unit having a plurality of input terminals each coupled to a different one of said plurality of output terminals of said velocity decoder and a control input terminal coupled to said control signal specifying the desired direction of rotation generated by said timing and control means.

* * * * *

UNITED STATES PATENT AND TRADEMARK OFFICE
CERTIFICATE OF CORRECTION

PATENT NO. : 4,118,129
DATED : October 3, 1978
INVENTOR(S) : Willy J. Grundherr

It is certified that error appears in the above-identified patent and that said Letters Patent is hereby corrected as shown below:

Claim 8, line 51, "thre" should be --the--.

Claim 8, line 59, "fetching" should be --reading out--.

Claim 8, line 63, "fetched" should be --read out--.

Signed and Sealed this

Twenty-seventh Day of November 1984

[SEAL]

Attest:

GERALD J. MOSSINGHOFF

Attesting Officer

Commissioner of Patents and Trademarks